UNITED STATES PATENT OFFICE 2,651,172

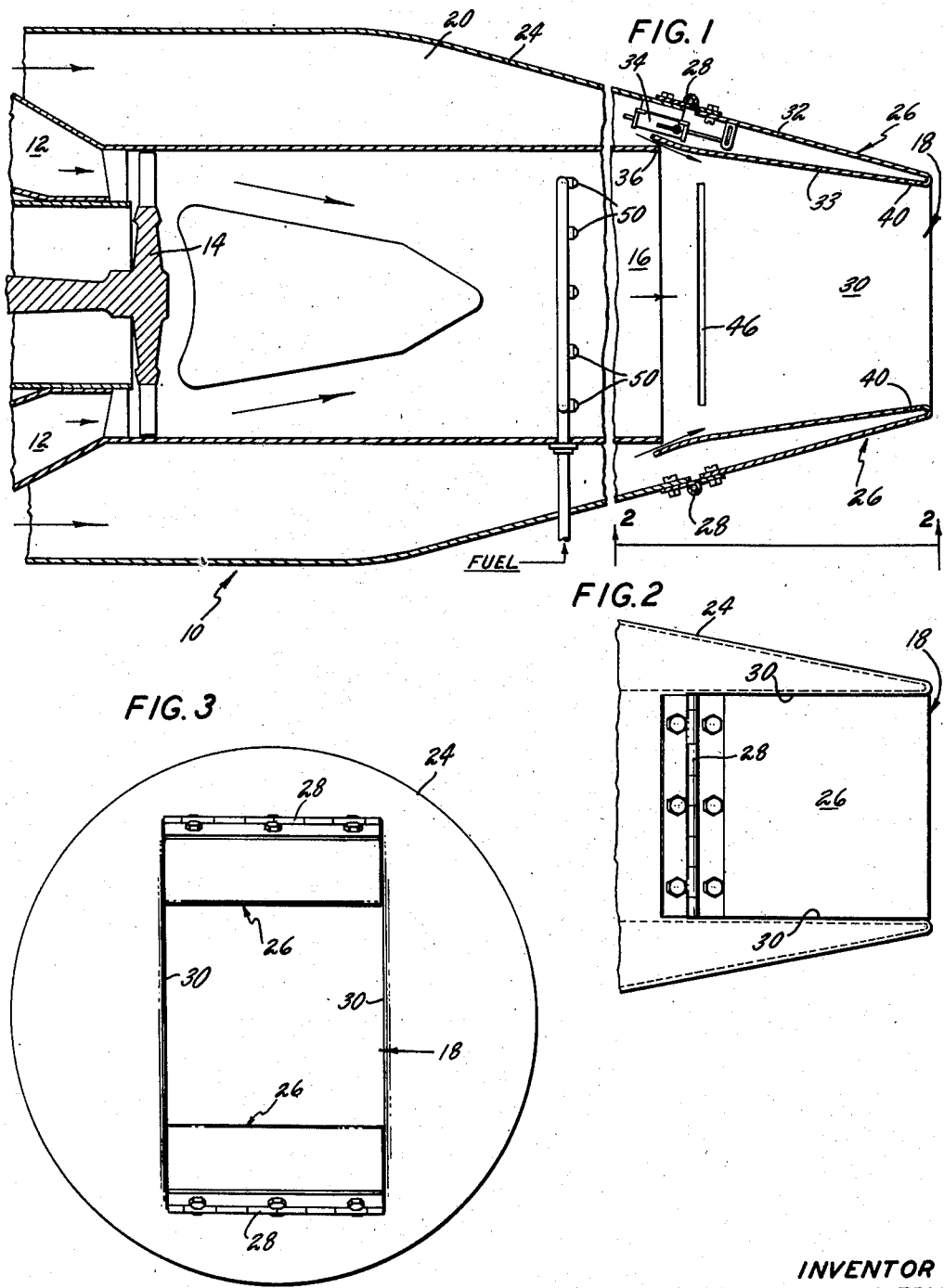

COOLING MEANS FOR VARIABLE AREA NOZZLES

William G. Kennedy, Wethersfield, Conn., assignor to United Aircraft Corporation, East Hartford, Conn., a corporation of Delaware Application August 15, 1952, Serial No. 304,461

12 Claims. (Cl. 60—35.6)

This invention relates to nozzles and more particularly to variable area nozzles for jet propulsion power plants.

It is an object of this invention to provide a variable area nozzle which will operate properly under extreme temperature ranges.

It is a further object of this invention to provide a nozzle of the type described and having a double wall construction which permits cooling air to circulate over critical portions of the nozzle walls.

These and other objects of this invention will become readily apparent from the following detail description of the drawing in which:

Fig. 1 is a partial cross-sectional view of a gas turbine power plant incorporating the features of this invention.

Fig. 2 is a partial view taken along the line 2—2 of Fig. 1; and

Fig. 3 is an aft end view of the Fig. 1 power plant.

In variable area exhaust nozzles for jet propulsion power plants it is desirable to maintain the walls of the nozzles at suitably low temperatures so as to avoid hot spots and also to avoid any binding of movable portions of such nozzles.

Referring to Fig. 1, a portion of a gas turbine power plant 10 is illustrated as having a combustion chamber 12 and a turbine rotor 14 which receives hot gases from the combustion chamber thereby absorbing power to drive a compressor (not illustrated). The hot exhaust gases pass rearwardly from exhaust pipe 16 and a nozzle 18. Surrounding the exhaust pipe 16 is annular chamber 20 which carries cooling air for maintaining the temperature of the exhaust pipe below a predetermined maximum. This same air is utilized to cool the walls of the nozzle in a manner hereinafter to be described.

As illustrated in Figs. 1 through 3, the outer wall 24 of the power plant changes from a circular configuration to a rectangular configuration at the nozzle 18. This is likewise true of the inner wall of the duct which becomes rectangular prior to the lip 36 which is described below. The nozzle 18 comprises two diametrically opposed movable flap elements 26 which move toward and away from each other about hinges 28 and between fixed side walls 30. Each of the movable flap elements 26 has an outer wall 32 and an inner wall 33 spaced apart at their upstream end and connected together at their downstream end. The outer wall 32 of the member 26 has its upstream end pivoted at the hinge 28 so that the entire member 26 can be moved toward or away from its opposing flap member 26 by means of actuating cylinder 34. The upstream end of the inner wall 33 of the flap 26 is curved slightly so that it will be in close proximity to the downstream end 36 of the wall of the exhaust pipe 16 in the varied positions of the flap element 26.

The wall 33 and the adjacent wall portion 36 are in juxtaposed relation; however, there is a sufficient gap or opening therebetween so that a continuous stream of coolant air will flow therethrough and will form an insulating layer along the wall 33.

The coolant air will also circulate between the double walls of the nozzle elements so as to maintain the temperature of the hinges 28 below a predetermined maximum to avoid any binding of the movable elements 26.

In order to insure adequate circulation of coolant air through the double walls of the nozzle a downstream opening such as 40 may be provided.

It may be further desirable to provide a slot in the fixed walls 30 of the nozzle, as for example as shown at 46 in Fig. 1, so as to further provide a layer of cool air over these walls.

A plurality of fuel nozzles 50 may be provided to supply a source of reheat or afterburning within the passage 16 to increase the thrust of the power plant for short periods of time.

It will be noted that as a result of this invention a simple but efficient variable area nozzle construction has been provided whereby heat transfer through the walls of the nozzle is retarded by providing an insulating layer of cool air over the walls of the nozzle.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In a variable area nozzle for a passage, said passage terminating in an opening defined by a lip, a plurality of members movably mounted adjacent said opening including a pivot laterally spaced from said opening, said members including double walls with at least one end of said walls being spaced apart to form a space therebetween, one of said walls being in juxtaposed relation with said lip at said one end and the other of said walls being laterally spaced from said lip at said one end, and pivot means operatively connecting the other of said walls at said one end to fixed structure laterally spaced from said passage.

2. In a variable area nozzle for a passage, said passage terminating in an opening defined by a lip, a plurality of members movably mounted adjacent said opening including a pivot laterally spaced from said opening, said members including double walls with at least one end of said walls being spaced apart to form a space therebetween, one of said walls being in juxtaposed relation with said lip at said one end and the other of said walls being laterally spaced from said lip at said one end, pivot means operatively connecting the other of said walls at said one end to fixed structure laterally spaced from said passage, and means for moving said members about said pivot means.

3. In a variable area nozzle for a passage, said passage terminating in an opening defined by a lip, a plurality of members movably mounted adjacent said opening including a pivot laterally spaced from said opening, said members including double walls with at least one end of said walls being spaced apart to form a space therebetween, one of said walls being in juxtaposed relation with said lip at said one end and the other of said walls being laterally spaced from said lip at said one end, pivot means operatively connecting the other of said walls at said one end to fixed structure laterally spaced from said passage, means for moving said members about said pivot means, and means providing a separate passage communicating with the space between said walls.

4. In a variable area nozzle for a passage, said passage terminating in an opening defined by a lip, a plurality of members movably mounted adjacent said opening including a pivot laterally spaced from said opening, said members including double walls with at least one end of said walls being spaced apart to form a space therebetween, one of said walls being in juxtaposed relation with said lip at said one end and the other of said walls being laterally spaced from said lip at said one end, pivot means operatively connecting the other of said walls at said one end to fixed structure laterally spaced from said passage, and means for connecting the other end of said walls together to form a chamber and means for directing cooling air to said chamber.

5. In a variable area nozzle according to claim 4 including at least one opening forming a passageway adjacent the other end of said walls to permit cooling air to flow through said chamber and out said opening.

6. In a variable area nozzle according to claim 4 including a spacing forming a passageway between said lip and said one wall, said spacing being of such dimension so as to provide a layer of cooling air to flow over the inner surface of said one wall.

7. In a variable area nozzle according to claim 6 including at least one opening forming a passageway adjacent the other end of said walls to permit a portion of the cooling air to flow through said chamber and out said opening.

8. A combustion chamber having an exhaust opening therefor, in combination with, at least one member movably mounted adjacent said opening having one end movable across the area defined by, said opening, said member comprising a pair of walls forming a V, one of the walls at the open end of the V being in juxtaposed relation with said opening and the other of said walls at the open end of said V being pivotally supported at a point spaced from said opening thereby maintaining the pivot away from the gases issuing from the combustion chamber.

9. A combustion chamber having an exhaust opening therefor, in combination with, at least one member movably mounted adjacent said opening having one end movable across the area defined by said opening, said member comprising a pair of walls forming a V, one of the walls at the open end of the V being in juxtaposed relation with said opening and the other of said walls at the open end of said V being pivotally supported at a point spaced from said opening thereby maintaining the pivot away from the gases issuing from the combustion chamber, and means for supplying a cooling air to the space between said walls.

10. A variable area nozzle, including a fixed area duct, a number of flaps forming extensions of the wall of the duct and movable relative thereto, each of said flaps including spaced converging plates connected together at their downstream ends, one of said plates having its upstream end overlying and sliding adjacent the end of said duct, the upstream end of the other plate being hinged to provide movement of the flap as a unit.

11. A variable area nozzle, including a fixed area duct, a number of flaps forming extensions of the wall of the duct and movable relative thereto, each of said flaps including spaced converging plates connected together at their downstream ends, one of said plates having its upstream end overlying and sliding adjacent the end of said duct, the upstream end of the other plate being hinged along a line outside of the duct and spaced from the line of contact between the duct and the upstream end of the first plate to provide movement of the flap as a unit.

12. A variable area nozzle, including a fixed area duct, a number of flaps forming extensions of the wall of the duct and movable to vary the area of the duct, each of said flaps forming an extension of a part of the duct wall and having a portion engaging and sliding adjacent the end of the duct, a hinge connection for said flap located outside of and spaced from the duct wall, said flap having openings for the flow of air around the duct between the hinge and the flap portion engaging the duct.

WILLIAM G. KENNEDY.

References Cited in the file of this patent

UNITED STATES PATENTS

| Number | Name | Date |
|---|---|---|
| 2,420,323 | Meyer et al. | May 13, 1947 |
| 2,481,330 | Neal | Sept. 6, 1949 |

FOREIGN PATENTS

| Number | Country | Date |
|---|---|---|
| 580,995 | Great Britain | Sept. 26, 1946 |